Aug. 25, 1953  K. POSTHUMUS  2,650,340
ARRANGEMENT FOR CONVERTING DIRECT VOLTAGES
INTO ALTERNATING VOLTAGES
Filed April 29, 1949

INVENTOR.
KLAAS POSTHUMUS.
BY
AGENT.

Patented Aug. 25, 1953

2,650,340

UNITED STATES PATENT OFFICE 2,650,340

ARRANGEMENT FOR CONVERTING DIRECT VOLTAGES INTO ALTERNATING VOLTAGES

Klaas Posthumus, Eindhoven, Netherlands, assignor to Hartford National Bank and Trust Company, Hartford, Conn., as trustee Application April 29, 1949, Serial No. 90,452
In the Netherlands May 3, 1948

9 Claims. (Cl. 321—36)

This invention relates to arrangements for converting direct voltages into alternating voltages by means of a number of gas-discharge tubes which are ignited in succession.

Arrangements comprising a number of gas-discharge tubes have been proposed in which the tubes are each connected in series with an output impedance constituted by an oscillatory circuit which is tuned to the frequency of the alternating voltage to be generated, the said series-connections being connected in parallel and connected to the source of direct voltage through a common choke coil. The gas-discharge tubes are ignited periodically at said frequency and in succession with uniform phase displacements, so that the output impedances carry phase-displaced voltages in accordance with the instants of ignition of the corresponding discharge tubes.

The present invention has for its object to provide an improvement in such arrangements.

According to the invention an arrangement for converting a direct voltage into an alternating voltage comprises a plurality of grid-controlled gas-discharge tubes, of which at least one is connected in series with an output impedance constituted by an oscillatory circuit which is tuned to the frequency of the alternating voltage to be produced, and a second tube (auxiliary tube) is connected in series with a source of auxiliary alternating voltage, the series-connections being arranged in parallel and connected to the source of direct voltage through a common choke, and the tubes being ignited in succession and periodically at said frequency, in which arrangement the auxiliary alternating voltage is chosen to be such that at the instant of ignition of the auxiliary tube the latter temporarily takes over the discharge from all other discharge tubes operative at this instant.

It has been found that in the known proposed circuit-arrangements, in addition to the desired state of operation, in which the direct voltage energy is converted into alternating voltage energy by periodic excitation of the oscillatory circuits, a stable state may sometimes occur, in which no oscillations appear in the oscillatory circuits and the gas-discharge tubes are conductive continuously.

With the use of the arrangement according to the invention, temporary extinction of the gas-discharge tubes which are then conductive is brought about whenever the auxiliary tube is ignited, thus avoiding the occurrence of the undesired stable state.

The oscillatory circuit tuned to the frequency of the oscillatory alternating voltage to be produced is preferably connected in parallel with the source of auxiliary alternating voltage and in series with the auxiliary tube. This yields the important advantage that the influence exercised by the current from the direct voltage supply on the source of auxiliary alternating voltage is materially reduced.

Preferably, the auxiliary alternating voltage is chosen to be such that at the instant of auxiliary tube ignition it has a polarity opposite to that of the direct supply voltage and such an amplitude that the anode voltage set up at the auxiliary tube exceeds its operating voltage.

Periodic extinction of the auxiliary tube at the instant of ignition of the subsequently ignited gas-discharge tube, so that the auxiliary alternating voltage becomes inoperative, is ensured if the auxiliary alternating voltage at the said instant of ignition has a polarity corresponding to the direct supply voltage and such an amplitude that the anode voltage of the gas-discharge tube then ignited exceeds the operating voltage of the auxiliary tube.

The form and frequency of the periodically operative auxiliary alternating voltage are arbitrary, provided that the conditions imposed are fulfilled. The voltage may, for instance, be a sawtooth voltage or a rectangular voltage. Use is preferably made of a sinusoidal auxiliary alternating voltage corresponding, with respect to frequency, to the alternating voltage to be produced.

In order that the invention may be more fully understood and readily carried into effect, it will now be described more fully with reference to the accompanying drawings, given by way of example. In the drawings corresponding elements bear the same reference numerals.

Figure 1:
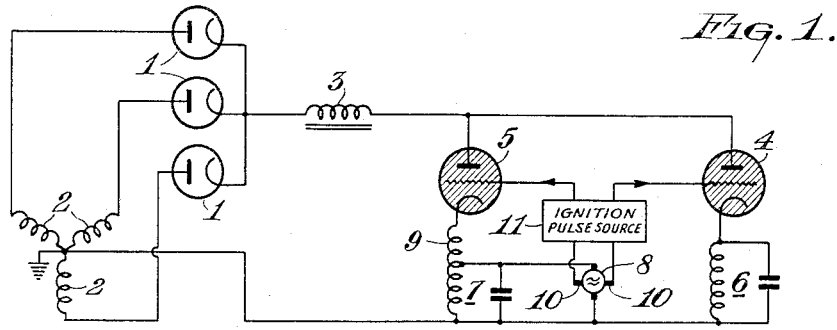
Fig. 1 represents an arrangement according to the invention for converting direct voltages into alternating voltages which arrangement comprises one oscillatory circuit which is used as a load circuit.

In the arrangement shown in Fig. 1 for converting direct voltages into alternating voltages, the direct voltage which is in this case required to be converted into an alternating voltage of comparatively high frequency, for example 10,000 c./sec., is obtained by rectification, by means of rectifiers 1, of a three-phase alternating voltage of mains frequency, which is taken from the secondary windings of a transformer 2. This direct voltage is supplied through a choke 3 to the anodes of two gas-discharge tubes 4, 5 connected in parallel and comprising control grids, the tube 5 constituting the so-called auxiliary tube. The cathode-circuits of the gas-discharge tubes comprise oscillatory circuits 6 (load circuit) and 7, respectively, tuned to the frequency of the alternating voltage to be produced. In parallel with the oscillatory circuit 7 a source 8 of auxiliary alternating voltage is connected, which parallel-arrangement is connected by way of an inductance coil 9 to the cathode of the auxiliary tube 5. The source 8 of auxiliary alternating voltage produces a sinusoidal alternating voltage whose frequency corresponds to the resonant frequency of the oscillatory circuits 6 and 7.

The generator 8 comprises two auxiliary brushes 10 at which a voltage displaced in phase by 90° with respect to the auxiliary alternating voltage applied to the circuit 7 is set up, which phase-displaced voltage is supplied to a pulse generator 11 for producing voltage pulses coinciding with the zero passages of this voltage. These voltage pulses are alternately supplied to the control grids of tubes 4 and 5 in order to ignite these tubes periodically with a relative phase-displacement of approximately 180° with reference to the alternating voltage to be produced.

The operation of the said arrangement will now be explained with reference to the time diagrams shown in Fig. 2.

In Fig. 2a, the references a and b designate the alternating voltages supplied to the tubes and the pulse generator respectively. Fig. 2b represents the voltage pulses generated by the pulse generator which are used for ignition of the gas-discharge tubes, which pulses are fed to the control grids of the tubes.

Supposing that the gas-discharge tube 4 is struck by means of an ignition pulse $p_1$ at the instant $t_1$. In view of the low internal resistance of a conducting gas-discharge tube, the upper end of the oscillatory circuit 6 will then be connected practically directly to the choke 3, so that the voltage at the end of the choke 3 adjacent the tube will follow the voltage set up at the oscillatory circuit 6 and will proceed sinusoidally.

After a time interval corresponding to one half cycle of the alternating voltage to be produced, the auxiliary tube 5 is struck by an ignition pulse $p_2$ at the instant $t_2$. Owing to the auxiliary alternating voltage the cathode of tube 5 exhibits at this instant (cf. Fig. 2a) a negative potential with respect to the cathode of tube 4, due to which the anode voltage of tube 4 drops below the operating voltage, so that this tube becomes extinguished.

Again after 180° of the altennating voltage to be prodded the gas-discharge tube 4 is struck by an ignition pulse $p_3$ at the instant $t_3$. Owing to the auxiliary alternating voltage, the cathode of tube 4 now has a negative potential with respect to the cathode of tube 5 and the latter becomes extinguished, whereupon the said cycle is repeated.

Even if no oscillations appear in the oscillatory circuit 6, the gas-discharge tubes 4, 5 are extinguished and struck every cycle period if the auxiliary altrenating voltage proceeds in this way. Thus, the said undesirable stable state is avoided.

In order to attenuate the coupling between the circuits 6 and 7 an inductance coil 9 is connected between the oscillatory circuit 7 and the cathode of the auxiliary tube 5.

During the time intervals in which the gas-discharge tubes 4, 5 are conductive, the gas-discharge tubes are traversed by a substantially constant direct current. During the time intervals in which the auxiliary tube 5 is conductive, the oscillatory circuit 7, of which the circuit current materially exceeds, say ten times, the current from the source 8 of auxiliary alternating voltage, will take the major part of the current of the auxiliary tube, so that the inffuence exercised by the current of the auxiliary tube on the source 8 of auxiliary alternating voltage is greatly reduced.

The transmission of energy from the source of direct voltage to the cathode circuits of the gas-discharge tubes 4, 5 is determined by the time integral of the product of the current from the source of direct voltage and the voltage set up in the respective cathode circuits of the gas-discharge tubes 4, 5. The duration of the conductive state of the gas-discharge tubes 4, 5 is determined by the appearance of the ignition pulses. By controlling either the phase of the release pulses with respect to the alternating voltage set up at the cathode of the gas-discharge tubes or the time intervals, during which the gas-discharge tubes are conductive, this transmission of energy is variable.

In the present example, the gas-discharge tube 4 is conductive during the time interval $t_1$—$t_2$, in which the circuit voltage set up at the oscillatory circuit 6 is positive. In this manner a maximum quantity of energy is fed to the oscillatory circuit 6.

Figure 2:
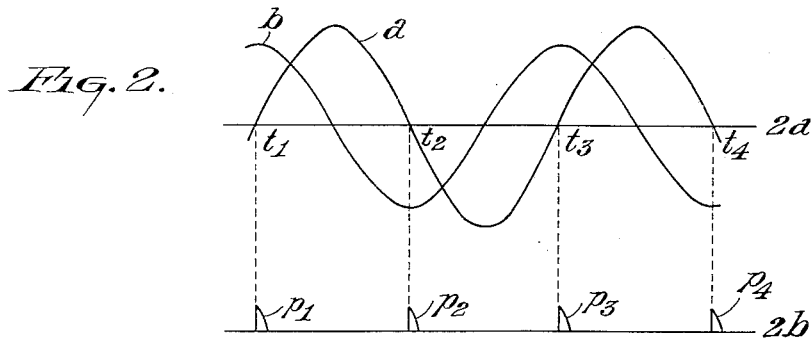
Fig. 2 represents voltage-time diagrams to explain the operation of the arrangement shown in Fig. 1.

In Fig. 2 the phase of the ignition pulses with respect to the auxiliary alternating voltage is chosen to be such that the average value of the auxiliary alternating voltage is substantially equal to zero during the time period $t_2$—$t_3$ in which the auxiliary tube 5 is conductive. Owing to this, the transmission of energy to the oscillatory circuit 7 and the source 8 of auxiliary alternating voltage connected thereto is likewise approximately zero.

Figure 3:
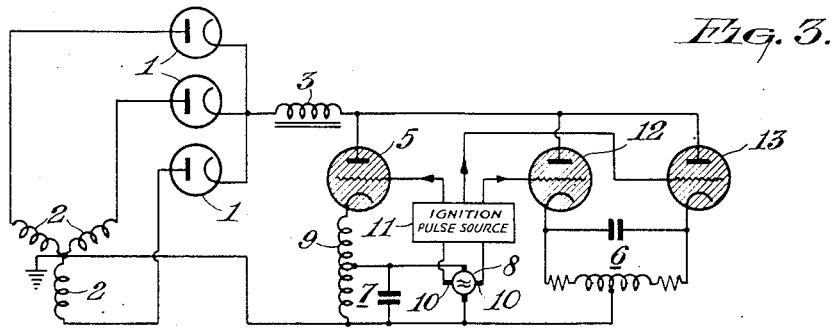
Fig. 3 is a variant of the arrangement shown in Fig. 1, comprising a push-pull excited load circuit.

In the example shown in Fig. 3, use is made of an oscillatory circuit 6, of which the centre is grounded and which is fed in push-pull connection by gas-discharge tubes 12, 13, the auxiliary alternating voltage having a frequency double that of the resonant frequency of the oscillatory circuit 6.

Figure 4:
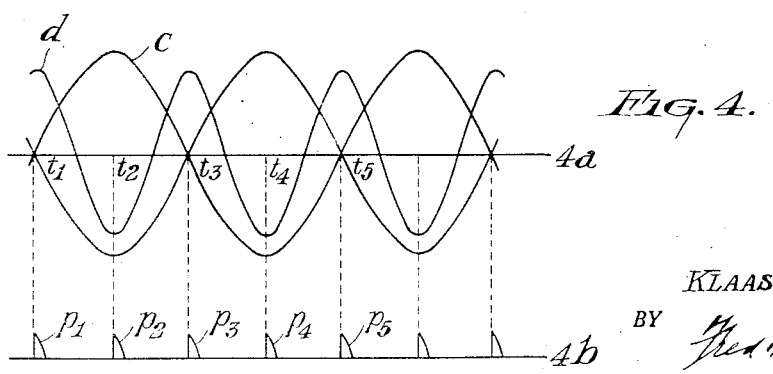
Fig. 4 represents voltage-time diagrams to explain the operation of the arrangement shown in Fig. 3.

The operation of the arrangement described will now be explained with reference to the time diagrams shown in Fig. 4.

In Fig. 4a, the references c and c' represent respectively the voltage appearing, during normal operation, in the circuit halves between the cathode of the gas-discharge tubes 12, 13 and the midpoint tapping of the oscillatory circuit 6, d representing the auxiliary alternating voltage. During every cycle of the alternating voltage to be produced four ignition pulses occur, which are shown in Fig. 4b.

Entirely similar in manner to the operation of the arrangement shown in Fig. 1, the gas-discharge tubes are ignited by the pulse-shaped voltages $p_1$, $p_2$, $p_3$, $p_4$, $p_5$ in the sequence 12—5—13—5—12 at the instancts $t_1$, $t_2$, $t_3$, $t_4$, $t_5$, ignition of a tube everytime involving extinction of the tube ignited just before.

Even if both gas-discharge tubes 12, 13 become conductive simultaneously, for example due to the absence of oscillations in the oscillatory circuit 6, these tubes become extinguished within one cycle under the action of the auxiliary alternating voltage, thus avoiding an undesirable stable state.

In addition to the examples described, many different embodiments of the invention are possible without departing from the scope thereof. For example, the arrangement may comprise an output impedance consistuted by two oscillatory circuits, each of which is connected, by way of a gas-discharge tube, to the common choke, and the auxiliary tube together with the source of auxiliary alternating voltage being connected in parallel with the said series-connections. The auxiliary alternating voltage may again correspond to the frequency of the oscillations to be produced, and the tubes are ignited in succession with relative phase-displacements of say 120°, measured with reference to the alternating voltage to be generated. In this event the load circuits carry voltages which are displaced in phase by 120°. In this case, also, the auxiliary alternating voltage ensures extinction of the gas-discharge tubes in each cycle.

What I claim is:

1. An inverter for translating a direct voltage into an alternating voltage of predetermined frequency comprising first and second grid controlled gaseous discharge tubes, an output impedance connected in series with said first tube to form a series connection, said output impedance including an oscillatory circuit tuned to said predetermined frequency, means connecting said second tube across said series connection, a source of auxiliary alternating voltage connected across said oscillatory circuit, means to interpose a load impedance between said second tube and said series connection, means including an inductance to apply said direct voltage across said series connection, and ignition means coupled between said source and the grids of the first and second tubes periodically to ignite said first and second tubes alternately at said predetermined frequency whereby said alternating voltage is developed across said load impedance, said auxiliary voltage having a phase at which said first tube is extinguished at the instant in which said second tube is ignited.

2. An inverter as set forth in claim 1, wherein said load impedance includes an additional oscillatory circuit tuned to said predetermined frequency.

3. An inverter as set forth in claim 1, wherein the frequency of said auxiliary voltage is said predetermined frequency.

4. An inverter for translating a direct voltage into an alternating voltage of predetermined frequency comprising first and second grid controlled gaseous discharge tubes, an output impedance connected in series with said first tube to form a series connection, said output impedance including an oscillatory circuit tuned to said predetermined frequency, means connecting said second tube across said series connection, a source of first and second auxiliary alternating voltages having the same frequency, said second voltage being shifted in phase relative to said first voltage, means to apply said first voltage across said oscillatory circuit, means to interpose a load impedance between said second tube and said series connection, means including an inductance to apply said direct voltage across said series connection, and ignition means coupled between said source and the grids of the first and second tubes and responsive to said second voltage to derive ignition pulses therefrom, said ignition pulses being supplied to said grids periodically to ignite said first and second tubes alternately at said predetermined frequency whereby said alternating voltage is developed across said load impedance, said first auxiliary voltage having a phase at which said first tube is extinguished at the instant in which said second tube is ignited.

5. An inverter as set forth in claim 4 wherein said second voltage is shifted 90° in phase and wherein said ignition means yield ignition pulses when said second voltage attains a predetermined value.

6. An inverter as set forth in claim 4 further including means to adjust the phase of said second voltage relative to the phase of said first voltage.

7. An inverter as set forth in claim 4 wherein said first and second tubes have equal ignition periods.

8. An inverter for translating a direct voltage into an alternating voltage of predetermined frequency comprising first and second grid controlled gaseous discharge tubes, an output impedance connected in series with said first tube to form a series connection, said output impedance including an oscillatory circuit tuned to said predetermined frequency, means connecting said second tube across said series connection, a source of auxiliary alternating voltage connected across said oscillatory circuit, means to interpose a load impedance between said second tube and said series connection, means including an inductance to apply said direct voltage across said series connection, and ignition means coupled between said source and the grids of the first and second tubes periodically to ignite said first and second tubes alternately at said predetermined frequency whereby said alternating voltage is developed across said load impedance, said auxiliary voltage having a phase and amplitude at which the voltage across said first tube is reduced below the value required for continued conduction at the instant in which said second tube is ignited and the voltage across said second tube is reduced below the value required for continued conduction at the instant in which said first tube is ignited.

9. An inverter as set forth in claim 8 wherein the average value of said auxiliary voltage during the conduction periods of said second tube is substantially zero.

KLAAS POSTHUMUS.

References Cited in the file of this patent

UNITED STATES PATENTS

| Number | Name | Date |
|---|---|---|
| 1,993,581 | Alexanderson | Mar. 5, 1935 |
| 2,005,458 | Eriksson et al. | June 18, 1935 |
| 2,024,173 | Langmuir | Dec. 17, 1935 |
| 2,147,474 | Wagner et al. | Feb. 14, 1939 |
| 2,338,118 | Klemperer | Jan. 4, 1944 |
| 2,475,621 | Klemperer | Jan. 12, 1949 |
| 2,486,703 | Bishop | Nov. 1, 1949 |